United States Patent [19]

Nardone et al.

[11] Patent Number: 5,668,949
[45] Date of Patent: Sep. 16, 1997

[54] SYSTEM UTILIZING MULTIPLE ADDRESS DECODE RESOURCES AND DECODER RECEIVING ADDRESS DETERMINES ADDRESS CORRESPONDING TO RESOURCE BASED ON SELECT AND READY SIGNALS BY THAT PARTICULAR RESOURCE

[75] Inventors: Joseph M. Nardone; Michael J. McTague, both of Portland; Howard S. David, Beaverton, all of Oreg.

[73] Assignee: Intel Corporation, Santa Clara, Calif.

[21] Appl. No.: 545,374

[22] Filed: Oct. 19, 1995

Related U.S. Application Data

[63] Continuation of Ser. No. 150,978, Nov. 12, 1993, abandoned.

[51] Int. Cl.⁶ ............................ G06F 12/10; G06F 13/12
[52] U.S. Cl. .................... 395/200.31; 395/299; 395/831; 395/200.59
[58] Field of Search ................. 395/200.01, 200.03, 395/829, 831, 293, 299, 823

[56] References Cited

U.S. PATENT DOCUMENTS

| | | | |
|---|---|---|---|
| 3,673,576 | 6/1972 | Donaldson, Jr. | 340/172.5 |
| 4,030,073 | 6/1977 | Armstrong, Jr. | 340/172.5 |
| 4,185,272 | 1/1980 | Feiker | 340/168 |
| 4,236,207 | 11/1980 | Rado et al. | 364/200 |
| 4,365,294 | 12/1982 | Stokken | 364/200 |
| 4,530,052 | 7/1985 | King et al. | 364/200 |
| 4,602,329 | 7/1986 | Ohtake | 364/200 |
| 4,964,038 | 10/1990 | Louis et al. | 364/200 |
| 4,969,121 | 11/1990 | Chan et al. | 364/900 |
| 5,103,426 | 4/1992 | Hidaka et al. | 365/230.03 |
| 5,117,500 | 5/1992 | Davis et al. | 395/800 |
| 5,175,822 | 12/1992 | Dixon et al. | 395/275 |
| 5,239,638 | 8/1993 | Pawlowski et al. | 395/425 |
| 5,287,512 | 2/1994 | Ellis | 395/425 |
| 5,367,657 | 11/1994 | Khare et al. | 395/425 |
| 5,404,481 | 4/1995 | Miyamori | 395/425 |

OTHER PUBLICATIONS

Intel DataBook 1991 – *Microprocessors vol. II*, (Intel Corporation, 1991). pp. 5–171–5–247.

*Primary Examiner*—Thomas C. Lee
*Assistant Examiner*—Rehana Perveen Krick
*Attorney, Agent, or Firm*—Blakely, Sokoloff, Taylor & Zafman

[57] ABSTRACT

A hybrid decoding module which resides on the computer system's high speed memory bus. The computer system incorporating the hybrid decoding module scheme is capable of having centrally decoded resources on the memory bus as well as resources capable of decoding memory bus addresses directly. During system initialization, or after a hard reset, the decoding logic polls each of the resources on the memory bus to determine whether the resource is a centrally decoded resource or a distributed decode resource. A table is maintained for all centrally decoded resources such that when addresses are put out by the processor during run-time, the decoding logic is capable of directing control to the centrally decoded resource. Another aspect of the present invention is implemented during the initialization of the system. When resources are polled by the decoding logic, they are also provided with an identifier which identifies the last available I/O space slot. If the memory bus resource requires this I/O space for its own use, it signals the decoding module that it should be assigned to that resource.

14 Claims, 5 Drawing Sheets

SYSTEM UTILIZING MULTIPLE ADDRESS DECODE RESOURCES AND DECODER RECEIVING ADDRESS DETERMINES ADDRESS CORRESPONDING TO RESOURCE BASED ON SELECT AND READY SIGNALS BY THAT PARTICULAR RESOURCE

This is a continuation of application Ser. No. 08/150,978, filed Nov. 12, 1993, now abandoned.

RELATED APPLICATION

The present application is related to U.S. Patent Application "Method and Apparatus for Initializing a Computer System Having Central and Distributed Address Decode Memory Bus Resources" invented by the inventors of the present application, assigned to the assignee of the present invention and filed concurrently herewith.

BACKGROUND OF THE INVENTION

(1) Field of the Invention

The present invention relates to the field of computer architecture. More particularly, the present invention relates to signal communications within a computer system with particular emphasis on the use of buses for the exchanging of information between computer components.

(2) Art Background

Modern computer architectures place heavy emphasis on the use of buses for the exchanging of information between components of computer systems. A bus is a collection of common wires or signal lines to which a plurality of components may be coupled for exchanging information with one another. Often, peripheral and other devices are coupled to an input/output (I/O) bus such as the well-known EISA bus for shared communication by peripheral devices to the system's processing unit. Such peripherals may be external to the computer system or housed in an integral unit with the computer system but separate from the integrated circuit or circuits comprising the system's processing unit.

Another bus frequently found in modern computer architectures is the high speed memory bus. Such a bus is frequently used to provide communications between a processing unit, memory modules and other modules which benefit from much higher speed communication with the processing unit than that provided by a standard I/O bus. Other modules which might advantageously reside on the memory bus rather than the I/O bus include such things as video processing modules which require high data exchange rates and computation power from the system processing unit.

When a processing unit requires the services of another module situated on the memory bus, the processing unit will signal the address of the desired memory bus module which will acknowledge the address and respond accordingly. Traditionally this procedure may be carried out in two distinct manners. One is by using a centralized decoding mechanism. In this approach, a decoding module resides on the memory bus. Addresses propagated by the processing unit are decoded by the centralized decoder which then selects the appropriate resource on the memory bus for communication with the processor. During system initialization, the decoder's logic determines which resources correspond to which addresses. The advantage of this approach is that resources on the memory bus need not be provided with decoding logic in order to watch for addresses being propagated by the processing unit. In such a mechanism, the decoding module controls the direction of signal propagation over the select lines to the memory bus resources. The disadvantage of such a scheme is that it is not easily extensible for building modular systems. If the system needs to be expanded, the decoder must be redesigned.

An alternative mechanism to the one described above is to use a distributed decoding scheme. In a distributed decoding scheme, each resource or module on the memory bus monitors the bus for addresses being propagated by the processing unit. When an address is propagated on the memory bus by the processing unit, each resource or module, through its own decoding logic, determines if it is the resource being addressed by the processor. If a given resource is the target resource then that module controls the activation of its own select lines for communication to the processor. Obviously, a disadvantage to such a mechanism is that the modules on the memory bus must each be incorporated with decoding logic for responding to addresses propagated by the processing unit. This mechanism, however, does allow for much more modular systems where additional resources may be plugged into a memory bus without having to modify a centralized decoder.

It would be an advantage, and is, therefore, an object of the present invention to be able to incorporate favorable aspects of both types of address decoding means for use on a high speed memory bus without having to increase the number of signal lines for communication between a processor and modules on the high speed memory bus.

Another disadvantage to current computer architectures is that I/O address space is generally reserved for specific slots or locations on the system I/O bus. Often times, this I/O space goes unused. Because the I/O address space is limited, locking up unused space prevents placing high performance I/O devices on the memory bus. It would be a great advantage and is, therefore, another object of the present invention to provide for the reassignment of I/O space originally dedicated for use by I/O devices on the I/O bus to be selectively provided to resources on the memory bus during system initialization to eliminate the problems described above.

BRIEF SUMMARY OF THE INVENTION

From the foregoing, it can be appreciated that there is a need to provide a mechanism for computer architectures which provides the flexibility to have memory bus resources that can be either centrally decoded or decoded in a distributed manner residing on the same memory bus. It is also seen that the it would be advantageous during system initialization to be able to reassign to memory bus resources I/O address space originally dedicated for I/O devices to avoid I/O space limitations. Therefore, it is an object of the present invention to provide a decoding mechanism for use on a high speed memory bus which provides for both centrally decoded resources as well as resources or modules that operate as distributed decode modules. It is further an object to provide the decoding mechanism of the present invention with the ability to reassign I/O space blocks from an I/O device space to modules residing on the memory bus.

These and other objects of the present invention are provided by the introduction of a hybrid decoding module which resides on the computer system's high speed memory bus. The computer system incorporating the hybrid decoding module is capable of having centrally decoded resources on the memory bus as well as resources capable of decoding memory bus addresses directly. During system initialization, or after a hard reset, the decoding logic polls each of the resources on the memory bus to determine whether the resource is a centrally decoded resource or a self-decoding resource. A table is maintained for all centrally decoded resources so that when addresses are put out by the processor during run-time, the decoding module is capable of directing control to the centrally decoded resource. The following discussion assumes a handshake protocol between the processor module and the selected resource. The processor module drives an address and an address strobe. The selected resource acknowledges selection by deasserting a ready signal. The selected resource indicates completion of the cycle by asserting a ready signal.

Distributed decode resources may be of two types, those with a fast select decode which are quickly capable of decoding memory bus addresses and those which are slower, referred to as slow select decodes. When a distributed decode address is propagated on the memory bus by the processing unit, fast decode resources are able to respond sooner than the start of the cycle and they alone control the cycle length via a ready signal. When a slow select resource is addressed on the memory bus, the decoding logic deasserts the ready signal and begins to cycle the requested address to the system's I/O bus. The slow select resource at a later time controls the ready signal through the hybrid decoding module using its select line. In this way, the slow select resource takes over control of the cycle from the hybrid decoding module.

During system initialization, all resources have their select lines controlled by the hybrid decoding module. It is during initialization that the hybrid decoder determines the true function of each select line. Each select line is polled and the resource reports back whether it is centrally or self-decoding.

Another important feature of the present invention is implemented during the initialization procedure of the computer system. When resources are polled by the decoding logic, they are also provided with an identifier which identifies the currently available I/O slot. If the memory bus resource requires this I/O space for its own use, it signals the decoding module that the I/O space should be assigned to that resource. If that resource does not require the designated I/O space, the decoding module then provides the same I/O space identifier to the next memory bus resource it polls. When a memory bus resource does indicate that it requires the additional I/O space, the I/O address space indicated by the decoder is assigned to that resource and the decoding module logic decrements a counter. Subsequent resources on the memory bus are then provided with a different identifier of available I/O space. The decoding logic assigns I/O space from the last available space first to avoid conflicts with devices then may be present on the system's I/O bus. Such a mechanism thereby provides flexibility in configuring a computer system such that it may have both centrally decoded and self-decoding memory bus addresses as well as providing for the reassignment of I/O space.

BRIEF DESCRIPTION OF THE DRAWINGS

The objects, features and advantages of the present invention will become apparent from the following detailed description in which.

DETAILED DESCRIPTION OF THE INVENTION

The present invention provides a method and apparatus for the initializing of a computer system on which resources on a high speed memory bus may be either centrally decoded by a central decoder or remotely decoded by decoding logic incorporated into the given resource. In the following description, numerous specific details are set forth such as particular signal lines and bit combinations in order to provide a thorough understanding of the present invention. It will be appreciated, however, to one skilled in the art that the present invention may be practiced without such specific details. In other instances, well-known control structures and gate level circuits have not been shown in detail in order not to obscure unnecessarily the present invention. Particularly, many functions are described to be carried out by various logic and timing circuits. Those of ordinary skill in the art, having been described the various functions, will be able to implement the necessary logic circuits without undue experimentation.

Figure 1A:
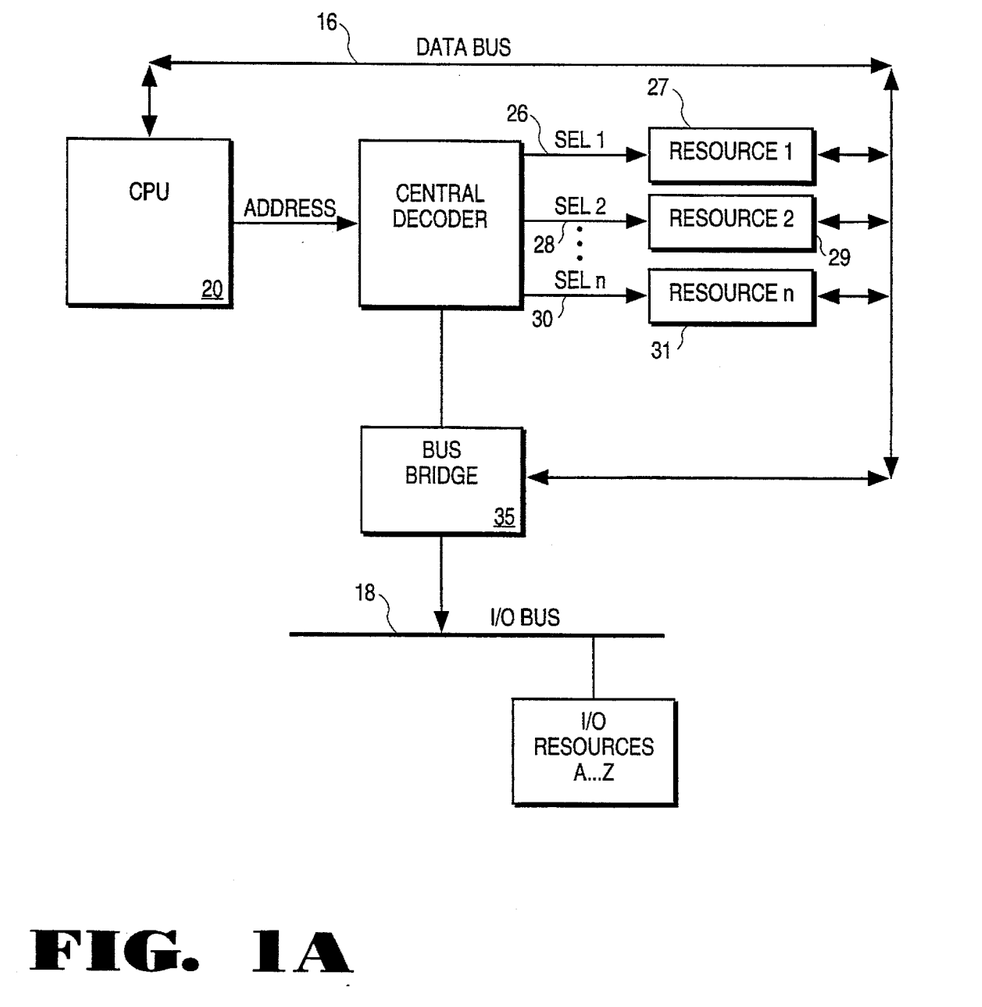
FIGS. 1(a) and 1(b) illustrate traditional memory bus decoding schemes.

Referring now to FIG. 1(a), a centralized decoding scheme for memory bus operation is graphically depicted. In such a scheme, a central processing unit (CPU) 20 propagates the desired address to a central decoder 25. The central decoder 25 maintains within it tables which associate a received address to any of a plurality of resources which may be coupled to it. This table may be developed during the system's initialization procedure or can be "hardwired". In FIG. 1(a), memory bus resources 27, 29 and 31 are illustrated corresponding to resources 1-n. The number of resources that may be coupled to a central decoder is a function of the complexity of the system being designed. When the central decoder receives an address from the CPU 20, it determines if that address corresponds to one of the resources 1 to n to which it is in communication. If the address propagated by the CPU does correspond to one of the memory bus resources, then the appropriate select line 26, 28, 30, etc. is activated signaling that resource is granted the memory bus to carry out an operation. That resources then may exchange data or other information with the CPU 20 over the data bus 16. If the address received by the central decoder does not correspond to an address in the central decoder's table, the address is propagated down to a bus bridge 35 which distributes the address over the system's I/O bus 18 for any resource on the I/O bus which may respond to the address. The I/O bus can be considered lower in the hierarchy of buses than the system's memory bus.

Figure 1B:
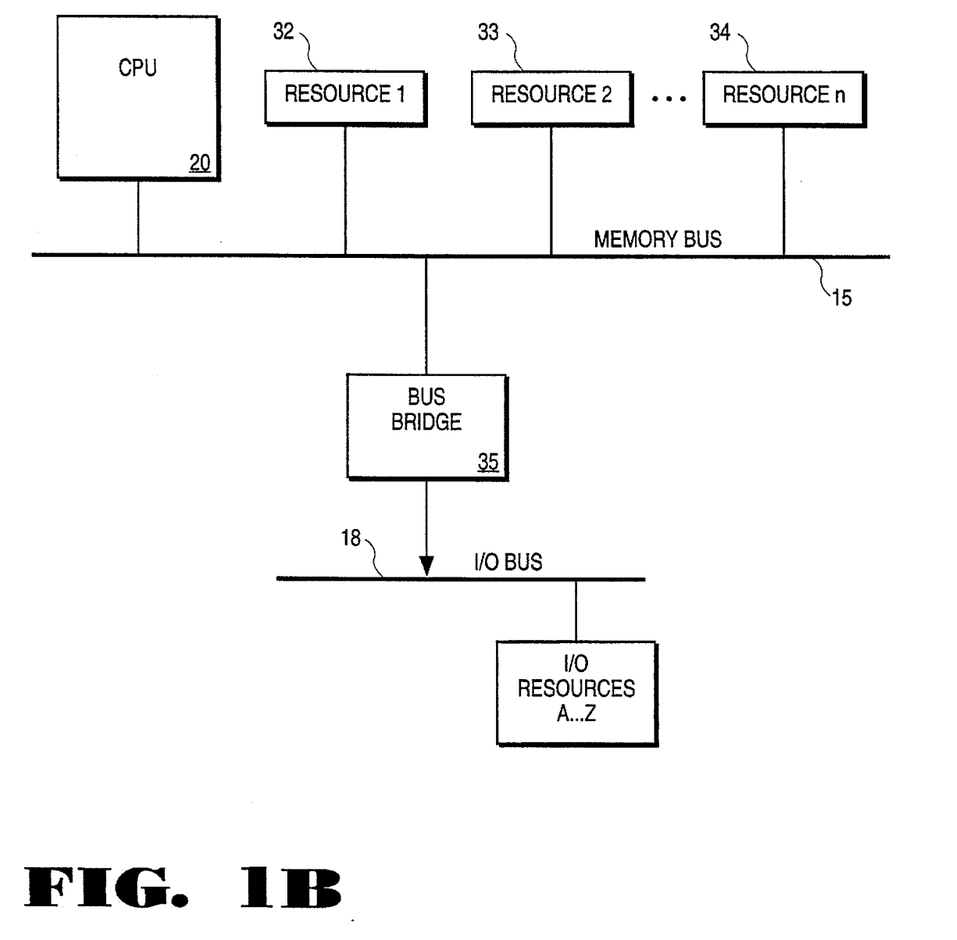

FIG. 1(b) illustrates a memory bus scheme in which no central decoder is implemented. In this scheme, the CPU 20 propagates addresses along the memory bus to all memory bus nodes rather than to a central decoder. The system of FIG. 1(b) illustrates three (3) memory bus resources 32, 33 and 34 each coupled to a memory bus. When addresses are propagated onto the memory bus by the CPU, each resource monitors for addresses corresponding to their own address space. The distributed decoding mechanism of FIG. 1(b) requires that each memory bus resource incorporate decoding logic for the monitoring of addresses for determining if it is the selected resource by the CPU. When a memory bus resource detects its address on the memory bus, it takes control of the bus and performs whatever activity it is designated to do. If none of the memory bus resources are selected by the propagated address, the bus bridge 35 forwards that address to the I/O bus 18 for any I/O resource that may respond to that address. The bus bridge 35 may operate in a number of ways in carrying out this activity. One is to wait a predetermined amount of time after which if no memory bus resource has responded then by process of elimination the bus bridge determines that the selected resource is on the I/O bus. Alternatively, the bus bridge may also be equipped with decoding logic and be aware of what address ranges the resources on the I/O bus occupy. In that case, addresses propagated to the I/O bus cause the bus bridge to assert the ready signal to the CPU and propagate the address to the I/O bus for attention by an I/O resource.

Figure 2:
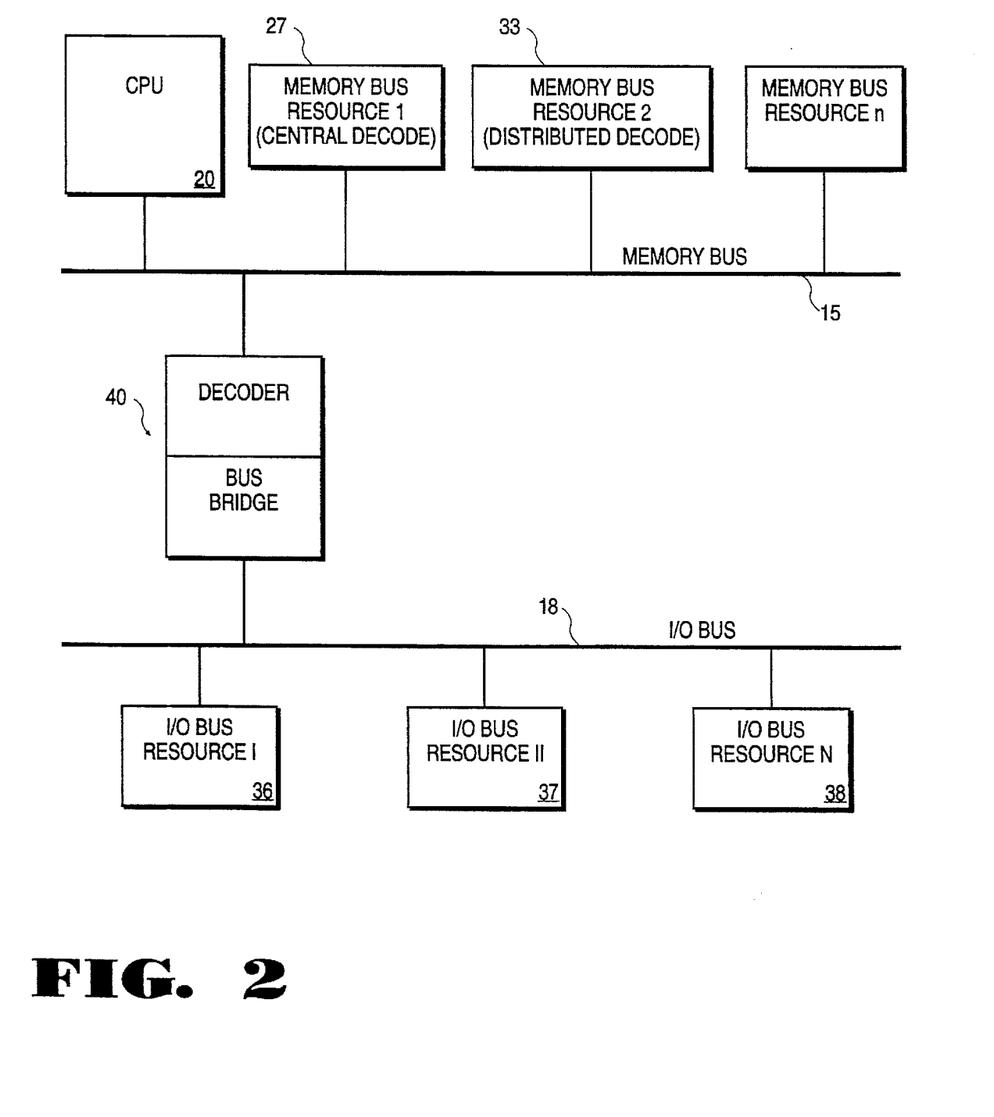
FIG. 2 illustrates a computer system architecture incorporating the present invention for providing both centrally decoded and distributed decode memory bus resources.

As was described above, both the central decoding scheme and distributed decoding scheme for memory bus implementations have several advantages and suffer several disadvantages. Thus, FIG. 2 illustrates the present invention bus protocol arrangement. The present invention implements a hybrid decoder and memory bus scheme that is different from the ones previously described in that memory bus resources may be either centrally decoded or incorporate their own decoding logic as in the distributed decode schemes. For example, in FIG. 2, memory bus resource 1 is the same resource 27 as the one illustrated in FIG. 1(a) which requires a central decoder for selecting it to be active on the memory bus. Memory bus resource 2 is a distributed decode resource such as the resource 33 depicted in FIG. 1(b).

Generally, centrally decoded memory bus resources are those associated with memory devices such as the main memory controller for the memory subsystem. Resources on the memory bus that use distributed decoding may comprise other memory related devices of other components such as video controllers and like devices which require high speed communication with the computer system's processing unit.

Also depicted in FIG. 2 is the system's I/O bus to which I/O bus resources 36, 37 and 38 are shown coupled. The I/O bus, like the memory bus in the figure is depicted as a single dark line. In actual implementation, both of these buses may comprise numerous signal lines each dedicated for carrying different signals according to an implemented protocol. The I/O bus can be used for typical I/O devices and peripherals normally associated with typical computer systems. One such bus is the EISA standard bus which provides for 16 (0–F) slots for the addition of resources to the I/O bus. Generally, a predetermined amount of memory space is dedicated to I/O resources.

Shown coupling the high speed memory bus 15 to the I/O bus 18 is the decoder/bus bridge arrangement 40 of the present invention. In FIG. 2 this is shown as two discrete elements, however, it may be implemented on a single integrated circuit or be merely tightly coupled as illustrated in FIG. 2.

The specifics of the run-time operation of the present invention hybrid decoder and memory bus arrangement will be described in more detail in a subsequent section. In general, the operation is the following: The CPU 20 will propagate an address along the memory bus 15. Distributed decode resources such as memory bus resource 33 will monitor and decode the addresses propagated on the bus, responding accordingly if it is selected resource. These resources will drive and assert a select line to the hybrid decoder to indicate selection. For centrally decoded resources, the central decoder 40 monitors for these addresses on the bus and applies the select line to the centrally decoded resource such as memory bus resource 27. For addresses propagated by the CPU that are neither centrally decoded memory bus resources or distributed decode resources, the bus bridge forwards the address to the EISA I/O bus 18 for the attention of the I/O resources present thereon.

Configuration Procedure

The emphasis of the present invention is on the initialization procedure carried out by the decoder/bus bridge 40 for determining whether a given memory bus resource is a centrally decoded resource or a distributed decode resource. For all decoded resources, the decoder/bus bridge 40 will control the activation of the select lines to the resource during initialization. After initialization, for distributed decode resources, the direction of the select lines is reversed such that the distributed decode resources drive the select lines to indicate to the decoder/bus bridge when one of the distributed decode resources is the CPU's target. Another aspect of the present invention that is carried out during the system's initialization procedure is the reassignment of I/O space to memory bus resources which require designated I/O space.

The initialization procedure carried out by the decoder/bus bridge 40 will be described in detail with respect to FIG. 3. The procedures which are described in the following occur either on initial power-up of the system or upon the signaling of a hard reset by the system. The functions to be carried out by the decoder/bus bridge 40 are to be carried out by the logic circuitry designed for the decoder 40. The detailed circuitry required for this will not be described in that those of ordinary skill in the art, once described the following functions will be able to implement the decoder 40 without undue experimentation in a variety of alternative circuit embodiments using programmable logic or other such devices.

Upon a system-wide reset condition such as system start-up or user-imposed reset, the decoder 40 controls all of the select lines to the memory bus resources. One resource at a time, the decoder 40 activates the memory bus resources' select lines to determine whether or not the resource uses central decode or a distributed decode mechanism. At the same time, the resource is provided with a code identifying the currently available unused EISA slot ID corresponding to I/O space availability. If the resource is a centrally decoded resource, then it responds with a code (Table I) that indicates that it uses central decode. As a result these select lines remain oriented such that they are driven from the decoder 40 to the particular module. The decoding logic then maintains a table entry indicating that the module associated with the particular select line is a central decode module with the corresponding address to which that module responds.

If the resource queried by the decoder 40 is equipped with decoding logic such that it is a distributed decode resource then it responds to the active select signal with a code (Table I) indicating that status. In addition, the code supplied to the decoder indicates whether or not the resource requires I/O space to be assigned to it. Table I illustrates a code propagated by a resource to the decoder for identifying information about the resource:

TABLE I

| Response Code | Translation |
| --- | --- |
| 0X1 | Slow decode on this select |
| 0X0 | Fast decode on this select |
| 01X | Do not take current EISA slot assignment |
| 00X | Take current EISA slot assignment |
| 1XX | Central decode on this select line |

Table I indicates that a resource may identify itself as either a slow decode or a fast decode resource. Both of these types of decode resources are distributed decode resources, however, they require different lengths of time for decoding addresses propagated on the memory bus by the CPU. The significance of the difference between slow and fast decode is a matter of importance during the run-time operation of the system after the configuration process has completed. Whether a given resource is a slow decode or fast decode resource, it is still a distributed decode resource and the direction of the select lines is reversed such that resource will now drive the select line active to the decoder 40 when that resource is addressed.

As was indicated, at the same time that a module identifies the type of decode module it is, it also indicates whether or not it requires I/O space to be assigned to it that would otherwise be assigned to the I/O bus. When the decoder has driven the select lines active to poll each module, it also supplies a 3-bit code indicating the currently available EISA memory slot in the I/O space. There are traditionally 16 EISA memory slots numbered from 0–F (Hex). These slots are generally occupied in ascending order. Accordingly, the I/O space reassignment starts from the most likely to be available which is the highest numbered unclaimed slot. Table II illustrates the bit sequence corresponding to the EISA slot address that may be provided to the queried resource:

TABLE II

| Bit Sequence | EISA slot ID |
| --- | --- |
| 111 | Slot ID Fh |
| 110 | Slot ID Eh |
| 101 | Slot ID Dh |
| 100 | Slot ID Ch |
| 011 | Slot ID Bh |
| 010 | Slot ID Ah |
| 001 | Slot ID 9h |
| 000 | Slot ID 8h |

If the resource being polled does not require the assignment of I/O space, it indicates that status to the decoding logic 40 according to the bit code shown in Table I. The decoder will then supply that same EISA Slot ID information to the next resource that it polls until that I/O slot is either taken by a memory bus resource or until the configuration procedure is complete. If a polled resource does require additional assigned I/O space, it indicates that status according to the bit sequence shown in Table I. In the case where a memory bus resource requires more than one I/O slot, multiple select line connections to the hybrid decoder are required. When a resource does take the current EISA slot assignment, the hybrid decoder module then decrements the bit code such that the next resource polled will be offered the available I/O slot preceding the one just assigned. For example, if a first resource takes EISA Slot F, then the next resource polled will be offered the I/O space corresponding to EISA Slot ID E.

The above procedure is repeated until all resources on the high speed memory bus have been polled to determine decode types and memory assignment requirements. The decoder then maintains a table for all centrally decoded resources while the select lines are reversed for all distributed decode resources. Additionally, resources requiring I/O space have received an EISA I/O slot assignment during this procedure.

Run-Time Operation

Figure 3:
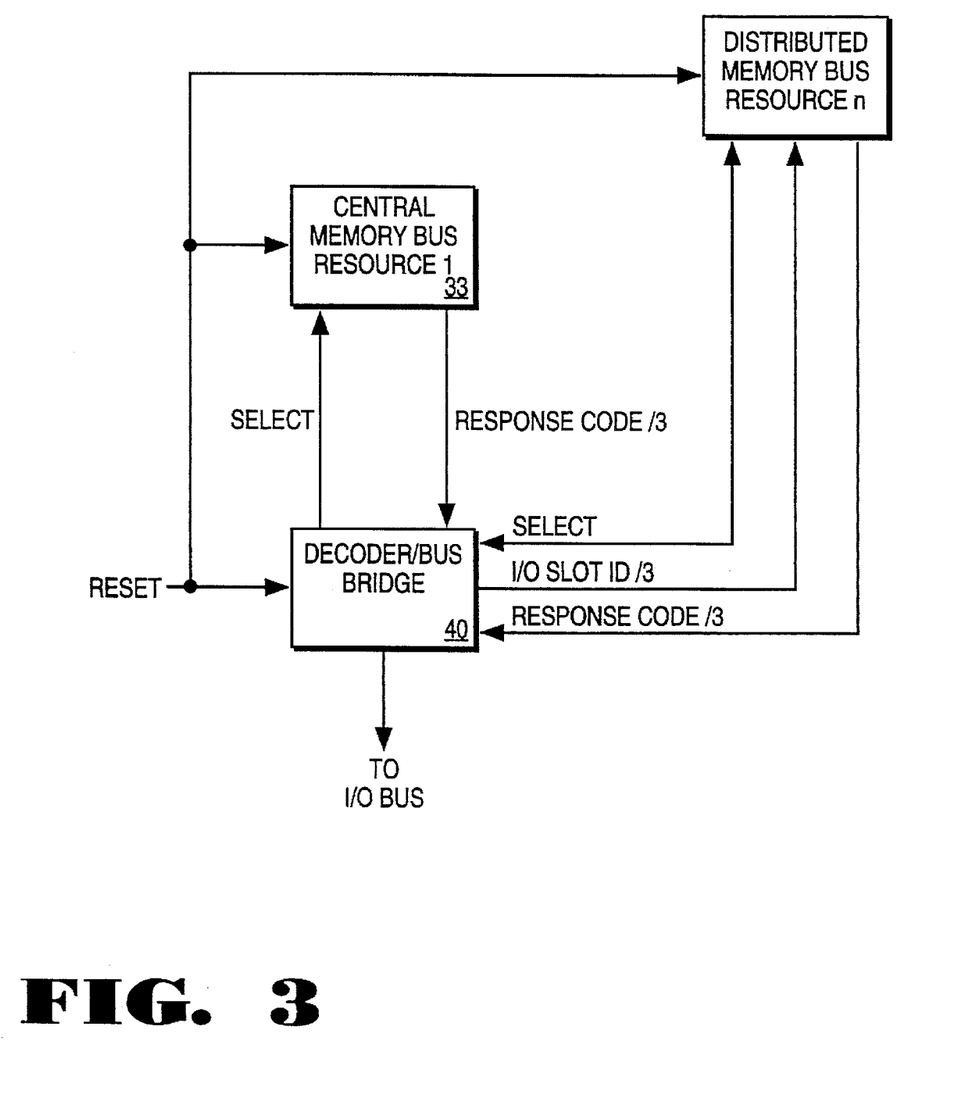
FIG. 3 is a more detailed block diagram of memory bus resources and communication with the hybrid decoder of the present invention for the exchanging of information during the initialization stage of the computer system.

Once the configuration cycle for the present invention has been completed, the hybrid decoder 40 illustrated in FIG. 3 maintains a table associating memory space addresses with all centrally decoded resources on the memory bus. The remaining resources on the memory bus are capable of decoding addresses themselves and are considered distributed decode resources. In many cases, the centrally decoded resources will be standard memory modules while the distributed decode resources may be other resources which require a high speed communications path with the system's processing unit.

The decoding mechanisms for distributed decode resources are divided into two categories: fast select decode resources and slow select decode resources. Centrally decoded addresses and fast select decoded addresses operate in much the same way. When a centrally decoded address is propagated by the processing unit, the central decoder 40 recognizes the address of a centrally decoded resource and asserts the ready (RDY) signal to the CPU 20 and drives the select line active for the memory bus resource being selected by the CPU. Data may then be exchanged between the selected resource and the CPU. The ready signal is asserted by the central decoder at the completion of the cycle.

When an address is propagated by the CPU which is directed toward a fast select decode resource, the target resource upon decoding the address deasserts the ready signal to the processing unit 20 and at the same time asserts the select line to the decoder 40 indicating that the decoder 40 should not forward the address request to subsidiary buses in the bus hierarchy such as the I/O bus. The fast select resource then initiates whatever information exchange is requested by the processing unit over the high speed memory bus. The ready signal is asserted by the fast select decode resource at the completion of the cycle.

Figure 4:
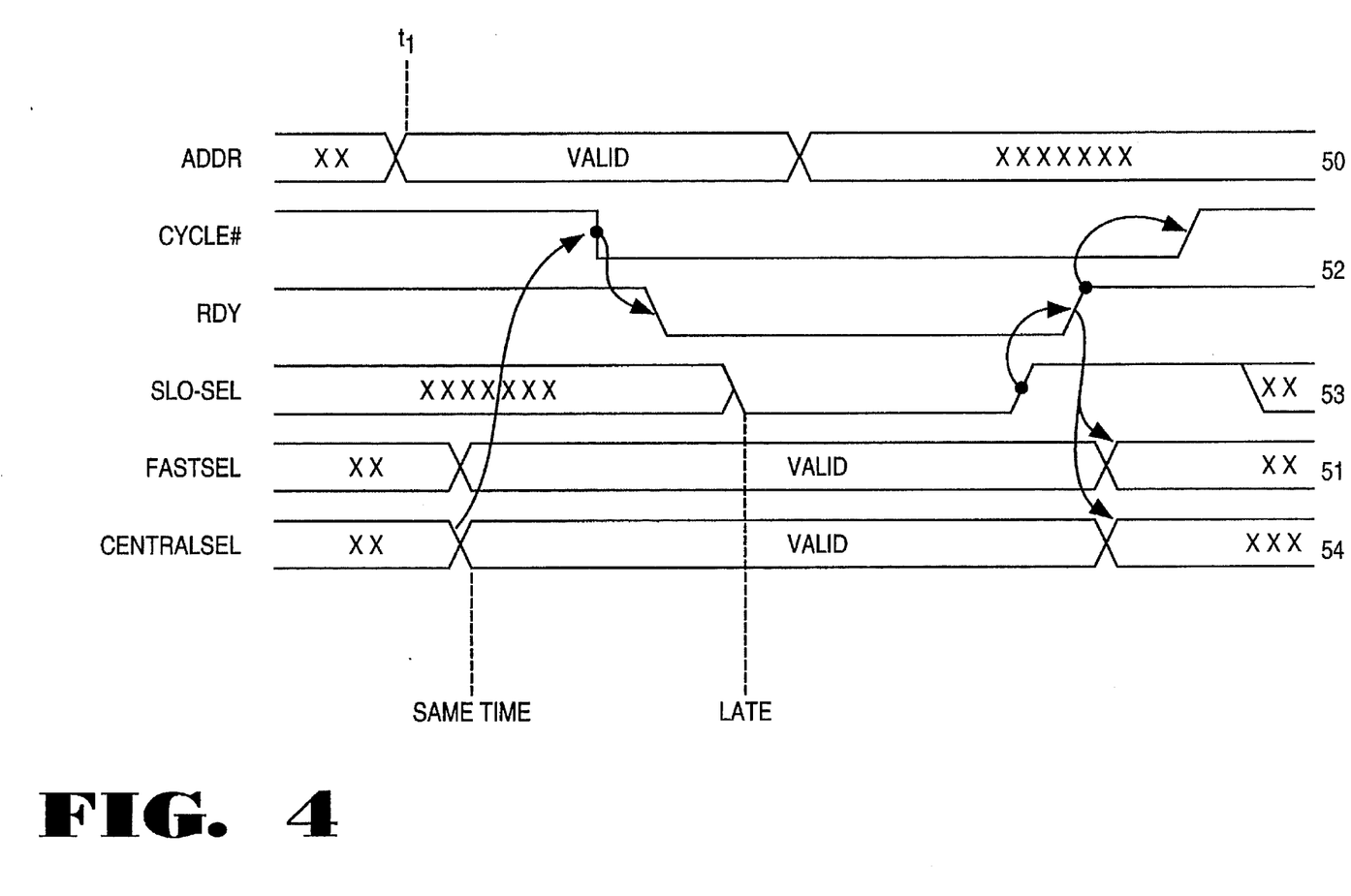
FIG. 4 illustrates the timing diagram illustrating the relative signal timings for different memory resource select types.

When the address propagated on the memory bus by the CPU is directed to a slow select resource, the behavior of the system is different from that described above with respect to fast select and standard memory resources. Slow select resources are precisely that: modules that require additional time to decode propagated addresses. Referring now to FIG. 4, the behavior of the system when a slow select resource is addressed will be described as contrasted with the behavior of a fast select resource. Timing line 50 corresponds to the memory bus signals when an address is put out by the CPU. It can be seen that the address signal goes valid at a time t. It can be seen that the fast select timing line 51 and central select line 54 provide for address decoding soon thereafter, prior to the transition of the RDY signal 52. Slow select resources on the other hand take longer to decode incoming addresses and will not have completed the address decode until after the RDY signal 52 has been deasserted by the decoder 40. The result is that the decoder selects as a default the system's bus bridge to propagate the address to the next lower bus on the hierarchy, the I/O bus, thus beginning an I/O cycle. It is only then that the slow select resource completes the decode of the address.

Once the slow select resource completes the decode, it activates its select line directed toward the decoder 40. The decoder then aborts the cycle to the I/O bus. However, at this time the decoder 40 has already deasserted the RDY signal 52 to the processing unit 20 so it then must operate at the behest of the slow select resource. The slow select resource then deasserts its select line to the decoder and through it controls the ready signal to the processing unit. The slow select resource when it completes its transaction on the memory bus then signals the decoder 40 to assert the RDY signal 52 using its select line to do this.

The above references to the ready signal consistently have ready deasserted at the beginning of a transaction and asserted at the completion of the transaction. An alternative protocol for centrally decoded and fast select memory resources lets the ready signal remain asserted throughout the transaction. In this case, the cycle length is set to a predetermined length of time, which depends on the particular type of transaction that is occurring.

The above run-time scheme allowing for distributed decode resources to be both fast and slow thus provides a wider variety of possibilities for high speed memory bus resources than ordinarily available. Although the present invention has been described in terms of preferred and implemented embodiments, it will be appreciated that various modifications and alterations might be made by those skilled in the art without departing from the spirit and scope of the present invention. The invention should, therefore, be measured in terms of the claims which follow.

What is claimed is:

1. A method of carrying out a transaction at an address in a computer system having a first, second, and third resource, and a processing unit requesting said transaction, the method comprising the steps of:
    (a) if said address corresponds to said first resource, then
        (i) said first resource asserting a select signal to said second resource;
        (ii) said first resource deasserting a ready signal;
        (iii) said fast resource completing said transaction;
    (b) if said address corresponds to said second resource, then
        (i) said second resource deasserting said ready signal;
        (ii) said second resource completing said transaction;
    (c) if said address does not correspond to the first resource or the second resource, then
        (i) said second resource deasserting said ready signal;
        (ii) said second resource forwarding said address to said third resource.

2. The method of claim 1 further comprising the steps of:
    (d) if said first resource does not respond to said address within a predetermined amount of time and said address does not correspond to said second resource, then
        (i) said second resource deasserting said ready signal;
        (ii) said second resource forwarding said address to said third resource.

3. The method of claim 1 wherein the second resource comprises a decoder/bridge circuit and a plurality of central decode resources, and the method, before step (a), further comprises the step of generating a table of addresses relating addresses to said plurality of central decode resources.

4. The method of claim 3 wherein the step (b)(ii) of completing said transaction further comprises the steps of:
    selecting a selected resource from said plurality of central decode resources which corresponds to said address using a table of addresses;
    asserting a second select signal to said selected resource.

5. A method of carrying out a transaction at an address in a computer system having a fast resource, bridge logic, and an I/O resource, and a processing unit requesting said transaction, the method comprising the steps of:
    (a) if said address corresponds to said fast resource, then
        (i) said fast resource signaling with a first select signal within a predetermined time;
        (ii) said fast resource deasserting a ready signal;
    (b) if said fast resource does not signal within said predetermined time, then
        (i) said bridge logic deasserting said ready signal;
        (ii) said bridge logic forwarding said address to said I/O resource in an I/O transaction.

6. The method of claim 5 wherein the computer system further comprises a slow resource, the method further comprising the steps of:
    (c) if said address corresponds to said slow resource, then
        (i) said slow resource signaling with a second select signal after said predetermined time;
        (ii) said bridge aborting said I/O transaction;
        (iii) said slow resource completing said transaction.

7. A method of carrying out a transaction at an address in a computer system having a first distributed decode resource, a central decode resource, a second distributed decode resource, a decoder, and a processing unit requesting said transaction, the method comprising the steps of:
    (a) if said address corresponds to said first distributed decode resource, then
        (i) said first distributed decode resource asserting a select signal to said decoder;
        (ii) said first distributed decode resource completing said transaction;
        (iii) said first distributed decode resource asserting a ready signal;
    (b) if said address corresponds to said central decode resource, then
        (i) said decoder asserting a second select signal to said central decode resource;
        (ii) said central decode resource completing said transaction;
        (iii) said central decode resource asserting said ready signal;
    (c) if said address does not correspond to said first distributed decode resource or said central decode resource, then
        (i) said decoder forwarding said address to said second distributed decode resource;
        (ii) said second distributed decode resource asserting a third select signal to said decoder;
        (iii) said second distributed decode resource completing said transaction;
        (iv) said decoder asserting said ready signal in response to said resource deasserting said third select signal.

8. A method of carrying out a transaction at an address in a computer system having a central decode resource, a distributed decode resource, a decoder circuit, a slow distributed decode resource, an I/O resource, and a processing unit requesting the transaction, the method comprising the steps of:
    (a) if said address corresponds to said distributed decode resource, then
        (i) said distributed decode resource asserting a first select signal to said decoder circuit;
        (ii) said decode circuit deasserting a ready signal;
        (iii) said distributed decode resource completing said transaction;

(b) if said address corresponds to said central decode resource, then
  (i) said decoder circuit deasserting said ready signal;
  (ii) said decoder circuit asserting a second select signal to said central decode resource;
  (iii) said central decode resource completing said transaction;
(c) if said address does not correspond to the distributed decode resource or the central decode resource, then
  (i) said decoder circuit deasserting said ready signal;
  (ii) said decoder circuit forwarding an I/O cycle to said I/O resource;
(d) if said address corresponds to said slow distributed decode resource, then
  (i) said slow distributed decode resource asserting a third select signal to said decoder circuit;
  (ii) said decoder circuit aborting said I/O cycle;
  (iii) said slow distributed decode resource completing said transaction.

9. The method of claim 8 wherein said step (d)(iii) of completing said transaction further comprises the step of deasserting said third select signal.

10. A computer system comprising:
a bus;
a processing unit coupled to request a transaction on said bus;
a distributed decode resource coupled to receive an address of said transaction from said bus and coupled to drive a first select signal and to deassert a ready signal if said address corresponds to said distributed decode resource;
a central decode resource coupled to receive said address from said bus and coupled to receive a second select signal;
a decoder coupled said bus to receive said address, to receive said first select signal, and coupled to drive said second select signal and deassert said ready signal if either said address corresponds to said central decode resource, or said address does not correspond to either of said central decode resource and said distributed decode resource.

11. The computer system of claim 10 wherein said distributed decode resource asserts said ready signal and deasserts said first select signal to complete said transaction.

12. The computer system of claim 10 wherein said central decode resource asserts said ready signal through said decoder to complete said transaction.

13. The computer system of claim 10 further comprising an I/O resource coupled to said decoder, said I/O resource coupled to receive said transaction when said address does not correspond to either said distributed decode resource or said central decode resource.

14. The computer system of claim 10 wherein said central decode resource comprises a plurality of individual central decode resources wherein said decoder includes an address table indicating an address for each of said plurality of individual central decode resources as determined at initialization of said computer system.

* * * * *